(12) United States Patent
Geuß

(10) Patent No.: US 11,052,885 B2
(45) Date of Patent: Jul. 6, 2021

(54) METHOD FOR ESTIMATING COEFFICIENT OF FRICTION OF A HYDRAULIC BRAKE SYSTEM

(71) Applicant: AUDI AG, Ingolstadt (DE)

(72) Inventor: Matthias Geuß, Breitengüßbach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/547,831

(22) Filed: Aug. 22, 2019

(65) Prior Publication Data

US 2019/0375386 A1 Dec. 12, 2019

Related U.S. Application Data

(63) Continuation of application No. 15/879,628, filed on Jan. 25, 2018, now Pat. No. 10,434,996.

(30) Foreign Application Priority Data

Feb. 14, 2017 (DE) .......................... 102017202296.5

(51) Int. Cl.
| | |
|---|---|
| *B60T 8/56* | (2006.01) |
| *B60T 8/1763* | (2006.01) |
| *B60T 8/172* | (2006.01) |
| *B60T 8/58* | (2006.01) |

(52) U.S. Cl.
CPC ............ *B60T 8/1763* (2013.01); *B60T 8/172* (2013.01); *B60T 8/56* (2013.01); *B60T 8/58* (2013.01); *B60T 2210/12* (2013.01); *B60T 2270/406* (2013.01)

(58) Field of Classification Search
CPC ... B60K 6/44; B60L 50/61; B60T 8/56; B60T 8/58; B60T 8/66; B60T 8/172; B60T 8/1763; B60W 40/06
USPC ................... 303/3, 7, 15, 20, 148–152, 155; 701/70–72, 80
See application file for complete search history.

(56) References Cited

U.S. PATENT DOCUMENTS

| | | | |
|---|---|---|---|
| 6,086,166 A | 7/2000 | Fukasawa | |
| 6,270,172 B1 | 8/2001 | Shirai et al. | |
| 6,324,461 B1 | 11/2001 | Yamaguchi et al. | |
| 6,377,885 B2 | 4/2002 | Yasui et al. | |
| 6,607,253 B1 | 8/2003 | Yamamoto et al. | |
| 6,910,747 B2 * | 6/2005 | Tsunehara ............... | B60L 50/61 303/152 |
| 7,059,687 B2 | 6/2006 | Yasui et al. | |
| 7,216,943 B2 * | 5/2007 | Nishikawa ............... | B60K 6/44 303/152 |
| 8,388,071 B2 | 3/2013 | Yokoyama et al. | |
| 8,645,040 B2 | 2/2014 | Krueger et al. | |

(Continued)

FOREIGN PATENT DOCUMENTS

| | | |
|---|---|---|
| DE | 35 02 050 A1 | 7/1986 |
| DE | 100 11 270 A1 | 9/2001 |

(Continued)

*Primary Examiner* — Christopher P Schwartz
(74) *Attorney, Agent, or Firm* — Maier & Maier, PLLC

(57) ABSTRACT

A system and a method for estimating the coefficient of friction of a hydraulic brake system with axle-individual pressure buildup of a motor vehicle. In addition, a system and to a method for setting the target braking torque of a hydraulic braking system with axle-individual buildup of a motor vehicle in order to obtain a desired actual braking torque.

9 Claims, 1 Drawing Sheet

(56) References Cited

U.S. PATENT DOCUMENTS

| | | |
|---|---|---|
| 8,838,357 B2 | 9/2014 | Watanabe |
| 2001/0033106 A1 | 10/2001 | Shirai et al. |
| 2005/0001474 A1 | 1/2005 | Zierolf |
| 2008/0100129 A1* | 5/2008 | Lubbers .................... B60L 7/18 303/113.1 |
| 2008/0174174 A1* | 7/2008 | Burns ................... B60W 20/13 303/152 |
| 2010/0062897 A1 | 3/2010 | Nishino et al. |
| 2015/0112568 A1 | 4/2015 | Hirota |
| 2016/0325628 A1 | 11/2016 | Okano et al. |

FOREIGN PATENT DOCUMENTS

| | | |
|---|---|---|
| DE | 10 2010 043 320 A1 | 5/2012 |
| DE | 10 2011 085 984 A1 | 5/2013 |
| DE | 10 2014 226 290 A1 | 6/2016 |

\* cited by examiner

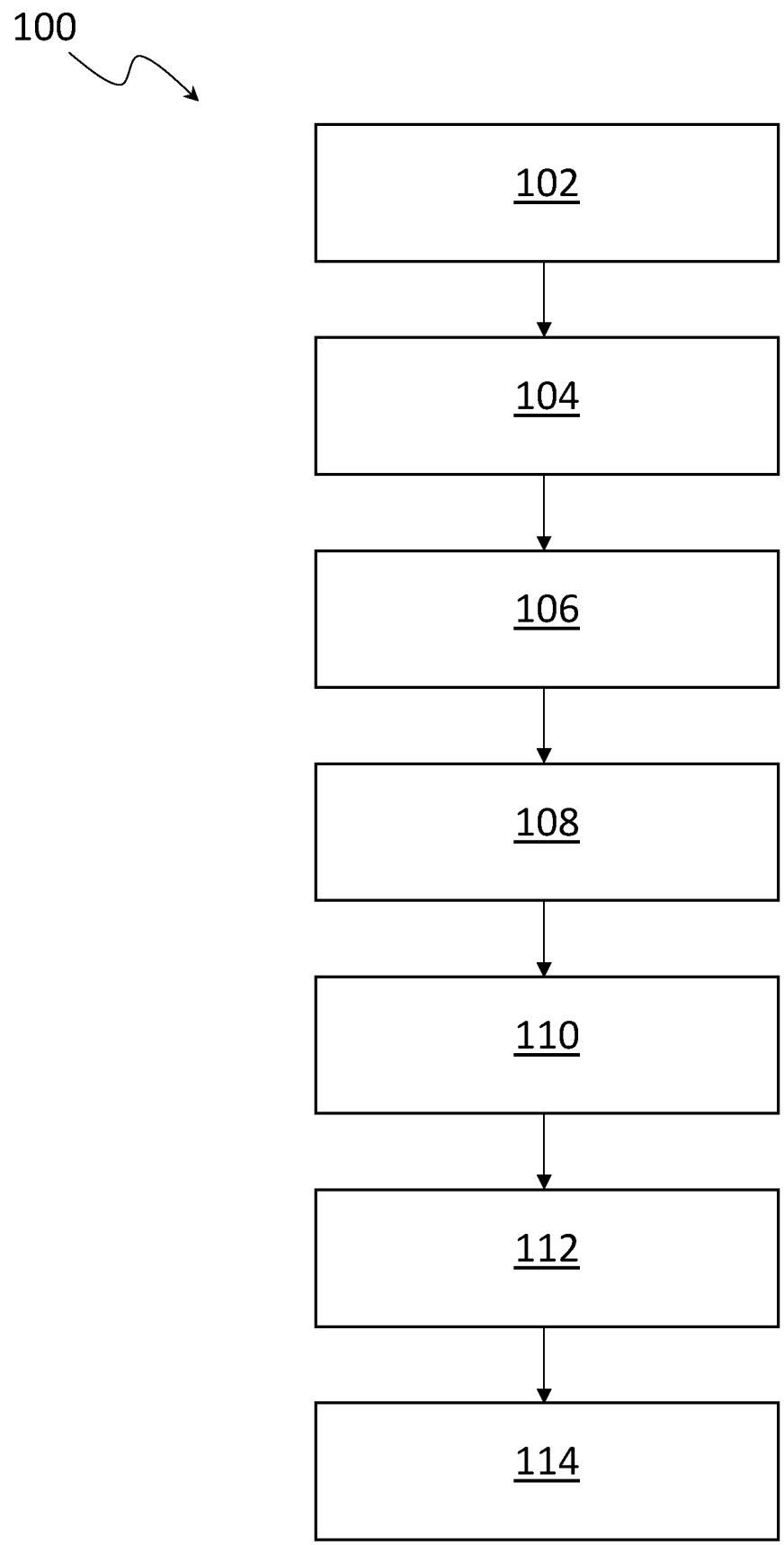

METHOD FOR ESTIMATING COEFFICIENT OF FRICTION OF A HYDRAULIC BRAKE SYSTEM

CROSS-REFERENCE TO RELATED APPLICATIONS

The present patent application claims benefit and priority to U.S. patent application Ser. No. 15/879,628 entitled "Method for Estimating Coefficient of Friction of a Hydraulic Brake System" filed on Jan. 25, 2018 and German Application No. 102017202296.5 filed on Feb. 14, 2017, which is hereby incorporated by reference into the present disclosure.

FIELD

The invention relates to a system and a method for estimating the coefficient of friction of a hydraulic brake system of a motor vehicle with axle-individual pressure buildup. In addition, the invention relates to a system and a method for setting the target braking torque of a hydraulic brake system for the pressure buildup of a motor vehicle with individual axes in order to obtain a desired actual braking toque.

BACKGROUND

The coefficient of friction (also known as the Cp value) of a hydraulic brake system, namely between the brake pad and the brake disk, determines the generation of the brake torque and it is proportional to the brake pressure. Since only the brake pressure can be measured, it is important for a obtaining accurate knowledge of the brake torque on the wheels to estimate the coefficient of friction as accurately as possible. The coefficient of friction can be calculated based on measuring the vehicle deceleration and the brake pressure when the vehicle parameters, such as vehicle mass, are known. There is also a method for estimating coefficient of friction for which the knowledge of the vehicle mass is not required and according to which the longitudinal deceleration generated by a friction brake is compared to the one which is generated by means of an E-machine, whose accurate torque is known.

DE 35 02 050 A1 proposes to measure as a parameter of the braking torque the temperature which is obtained in the braking device in the moment when the braking torque is generated and to evaluate it in an evaluation device.

DE 100 11 270 A1 discloses a method and a device for determining a parameter of a wheel brake which represents the relationship between the braking torque and the brake pressure. The determination of the brake parameter occurs individually for each wheel by calculating wheel-specific variables such as wheel slippage, the wheel contact force, the wheel brake pressure and the wheel radius.

DE 10 2011 085 984 A1 discloses a method for a determination of the coefficient of friction in vehicles on individual wheels, wherein the friction torque is determined according to a predefined torque curve at one wheel of the vehicle and in response to the wheel torque. The current coefficient of friction can be determined from the phase shift between the wheel torque and from the rotational speed of the wheel.

DE 10 2014 226 290 teaches a method for adjusting or controlling a brake actuation parameter BR(FZ) which either uses the clamping force F, or the brake pressure PR, or the clamping path X (xs) of a vehicle brake which is provided with at least one braked wheel R within an electro-hydraulic or electro-magnetic vehicle brake, which is fixed to a chassis of the vehicle with a brake holder and which brakes the wheels by means of friction pads according to the extent of the brake actuation BR(FZ), wherein the wheel circumferential force F (FU) resulting from the contact of the braked wheel with the read surface is measured and the braking force F (FU) is influenced depending on the braking force as a function of the gradient of the wheel circumferential force F ($\Delta$FU/$\Delta$s), and wherein the actual value of the regulation is the gradient of the wheel circumferential force F ($\Delta$FU/$\Delta$s) and this actual value is adjusted by adjusting the magnitude of the brake actuation BR(FZ) to a predetermined target value TVR(OP($\Delta$FU/$\Delta$s), or to a target value TUR(OP($\Delta$FU/$\Delta$s)+/-R($\Delta$FU/$\Delta$s).

From DE 10 2010 043 320 A1 are known devices and a method for determining a measured variable for a frictional force acting on a disk brake of a motor vehicle. A sensor device arranged on the disk brake measures the displacement of the brake holder that is caused by the effect of the braking force in a direction perpendicular to the axial direction of the brake disk.

One measure for the effective braking torque is determined based on the deformation resulting from the frictional force caused in a direction that is tangential to the surface of the brake disk.

DE 10 2016 220 415 proposes a method for estimating the coefficient of friction of a hydraulic brake system of a motor vehicle, wherein the brake torque is adjusted by means of an accurate actuator, the deceleration of the vehicle or of the wheel is measured and the transmission behavior determines the deceleration of the brake torque. Subsequently, a braking torque is set by means of the hydraulic brake system and the deceleration is measured. The actual brake torque can be determined and the coefficient of friction of the brake can be estimated with the inverse of the brake torque delay for a certain transmission ratio.

The present method applies only to brake systems that are provided with a pressure buildup at the level of the main cylinder. In the case of brake systems with a pressure buildup for an individual axle, it is not possible to infer the coefficient of friction of the individual axles. This is because this approach is based on a total vehicle coefficient of friction (based on a fixed ratio of the use of the axes, usually according to an adjusted distribution). However, with a pressure buildup for individual axles, the distribution of the braking torque to the axles can be varied. Different deviations from the standard coefficient of friction may then occur on the brakes of both axles. That is why it is not possible to infer the coefficient of friction on individual axles from the response of the vehicle. In other words, when the total vehicle coefficient of friction is based on a certain distribution, it is not clear which of the axles causes a deviation from a standard coefficient of friction and how large this deviation is.

SUMMARY

Based on this background, the objective is to provide a system and a method for estimating the coefficient of friction of a hydraulic brake system with axle-individual pressure buildup of a motor vehicle without using vehicle parameters such as for example the vehicle mass. A brake system with axle-individual pressure buildup acts on each axle of the vehicle separately.

Within the context of the present invention is presented a system for estimating a coefficient of friction of a hydraulic brake system with axle-individual pressure buildup of a motor vehicle. In addition, a method for estimating a coefficient of friction is proposed with axle-individual pressure buildup of a motor vehicle.

Moreover, a method is proposed for adjusting a target braking torque of a hydraulic brake system of a motor vehicle in order to obtain a desired actual braking torque, as well as a system suitable for the method.

BRIEF DESCRIPTION OF THE FIGURES

FIG. 1 shows an exemplary embodiment of a method for estimating a coefficient of friction of a hydraulic braking system with axle-individual pressure buildup.

DETAILED DESCRIPTION

The invention provides a solution for estimating the coefficient of friction of a hydraulic brake system with axle-individual pressure buildup of a motor vehicle, which can be obtained without the use of vehicle parameters such as for example the vehicle mass. A brake system provided with axle-individual pressure buildup acts separately on each axle of the vehicle.

The method according to the invention makes it possible to determine the coefficient of friction for the individual axles of the motor vehicle. Within the context of the invention it is possible to use adjusting and measuring systems that are as a rule available in the vehicle. Further advantages and embodiment of the invention will be evident from the following description.

The system according to the invention comprises at least one hydraulic brake system with axle-individual pressure buildup which acts on a wheel or on an axle of a motor vehicle, as well as at least one other actuator system, which can apply a braking torque with a higher adjusting pressure than the hydraulic brake system to the wheel or to the axle. Furthermore, the system according to the invention comprises at least one sensor and one unit for calculating an estimated coefficient of friction from the sensor data.

In one embodiment, the system is provided with at least one actuator system on each axle, which makes it possible to apply a braking torque to the axle or to a wheel connected to the axle with a higher actuating precision than with the hydraulic brake system with an axis-individual pressure buildup.

In one embodiment, the other actuator system comprises at least one axle engine. In another embodiment, the other actuator system comprises at least one EM single-wheel engine.

In the system according to the invention is contained at least one sensor that is suitable for example for measuring the vehicle deceleration. In one embodiment, the system comprises at least one sensor for the rotational speed of the wheel. In another embodiment, the system comprises at least one wheel speed sensor. In another embodiment, the system comprises at least one brake pressure sensor.

FIG. 1 shows an exemplary embodiment of a method according to the invention for estimating the coefficient of friction of a hydraulic brake system with an axle-individual pressure buildup of a motor vehicle 100. A braking torque (target=current), which is applied via an actuator system 102 and which provides a higher actuating precision than the hydraulic brake system (hereinafter also referred to as a "more accurate actuator") to a first wheel or to a first axle, measured by means of the deceleration of the torque of the wheel or of the axle of the vehicle determining the transmission ratio between the braking torque and the deceleration of the wheel or of the wheel or of the vehicle 104. The braking torque applied to the first wheel or to the first axle 106 via the hydraulic brake system is measured 108 and the deceleration of the wheel or of the axle or of the motor vehicle is determined 110. After that, using the inverse transmission ratio between the braking torque and the deceleration of the wheel or of the axle or of the motor vehicle 112, the actual braking torque and the actual coefficient of friction of the hydraulic brake system is thus calculated with the axle-individual pressure buildup for the first axle of the motor vehicle 114.

When the wheel brakes are coupled to an axle, for example hydraulically, the braking torque at the wheel corresponds to half of the braking torque at the axle. When the axles are coupled via the brake system, for example by means of a distribution that is adjusted hydraulically, the braking torque at the corresponding axle can be calculated with this distribution and with the total brake torque.

In one embodiment, the method according to the invention additionally comprises the determination of the coefficient of friction of the hydraulic brake system with axle-individual pressure buildup for at least one other axle of the motor vehicle.

One embodiment of the invention is based on the realization that the axles must be considered separately. The axles must be therefore stimulated in a decoupled manner. A braking torque (target=actual) is set by means of an accurate actuator and the deceleration of the vehicle or the wheel deceleration is measured and the transmission ratio-wheel deceleration is determined. After that, a target brake torque is applied by means of the hydraulic brake system separately, first at the first axle and then at least one other axle, for example at the second axle, and the respective decelerations are measured. In this manner it is possible to estimate with the inverse transmission ratio and torque-deceleration the actual braking torque and thus also the coefficient of friction of the brake for each axle. When the hydraulic braking torque is applied, a deceleration torque can be applied with an axial motor, for example to maintain the driving stability, at the other axle or at the first axle. Since the deceleration torque is known with precision, it can then be further calculated based on the calculated braking torque whether this deceleration torque is known with accuracy.

The desired braking torque usually differs from the actual braking torque due to an unknown coefficient of friction of the brake system. Other actuator systems are also known (for example EM motors for individual wheels, or EM axle motor), which make it possible to apply a braking torque with a higher actuating precision than the brake system. The target brake torque thus corresponds well to the actual braking torque. A braking torque is adjusted at a first wheel or at a first axle via the actuator system with a high actuating precision (target braking torque=actual braking torque) and the wheel deceleration or the vehicle deceleration is measured and the transmission ratio between the braking torque and the wheel deceleration or vehicle deceleration is determined.

After that, a target braking torque is applied with the hydraulic brake system to the first axle and the vehicle deceleration or wheel deceleration is measured and the actual torque of the friction brake of this axle is closed with the inverse transmission ratio torque-deceleration. When the target torque and the nominal coefficient of friction are known, the actual coefficient of friction can be inferred as follows:

actual coefficient of friction=actual braking torque/
target braking torque*nominal coefficient of
friction.

As an alternative, the same actual coefficient of friction can be calculated by measuring the braking torque of the actual coefficient of friction:

actual coefficient of friction=actual braking torque/
brake pressure

After that, the same procedure is used for a braking torque at another axle of the motor vehicle, for example at the second axle, and the coefficient of friction is determined for this axle.

The determination of the coefficient of friction for at least one further axle of the motor vehicle thus comprises the following steps: adjusting a braking torque at one wheel of a further axle or at a further axle of the motor vehicle via an actuator system which provides a higher actuating precision than the hydraulic brake system, and measuring the deceleration of the wheel or of the axle or of the motor vehicle which is caused by the braking torque and determining the transmission ratio between the braking torque and the deceleration of the wheel or of the axle or of the vehicle. After that, applying a target braking torque to the wheel or the axle of a motor vehicle by means of the hydraulic brake system, measuring the deceleration of the wheel or of the axle or of the motor vehicle which is caused by the braking torque and estimating the braking torque with the inverse of the previously determined transmission ratio between the braking torque and the deceleration of the wheel or of the axle or of the motor vehicle, and finally calculating the coefficient of friction of the hydraulic brake system with axle-individual pressure buildup for the other axle of the motor vehicle.

For an accurate determination of the coefficient of friction it is advantageous when an actuator system is available on each axle which is provided with a higher actuating precision that the hydraulic brake system. However, it is also possible to determine the coefficient of friction of both axles of a vehicle provided with two axles with a system in which another actuator system which has a higher actuating precision than the hydraulic brake system is provided only on one axle. In this embodiment, the measurement is carried out on the first axle and the value of the second axle is calculated for example by taking into account slipping.

In another embodiment is used that fact that the two axles of a motor vehicle have a different dynamic driving potential. In the case of deceleration, in particular the front axle is more stable and it can thus be impacted by a higher braking torque. Since the coefficient of friction on both axles cannot be estimated together, the coefficient of friction of the most stable axle is estimated first (which is to say a braking torque applied only to this axle). When this coefficient of friction is known, a braking torque can be applied to both axles and the second coefficient of friction is estimated based on a certain distribution of the braking force. With this approach, it is not necessary to apply a braking torque only to the (unstable) rear axle, since a stable braking force distribution can be used in order to estimate the coefficient of friction on the rear axle. When the hydraulic braking torque is applied, it is possible for example to apply a deceleration torque at the other axle or at the first axle, for example in order to maintain the driving stability. Since this deceleration torque is known with precision, it can be calculated from the calculated actual braking torque. Another advantage of this embodiment is that an additional, highly accurate actuation system must be provided only at the front axle.

In this embodiment, a braking torque (target=actual) is set via an accurate actuator, the deceleration of the vehicle or the wheel deceleration is measured and the transmission ratio braking torque-deceleration is measured. After that, a target braking torque is applied via the hydraulic brake system at first at the first axle, preferably the axle that has a higher dynamic driving potential, and the deceleration is measured. Therefore, the braking torque and the acceleration can be estimated with the inverse transmission ratio for the actual braking torque and the coefficient of friction of the brake can thus be estimated for the first axle. At this point, the target torque is applied with a determined ratio to both axles and the deceleration is measured. In this manner, the actual braking torque and thus also the coefficient of friction are estimated with the inverse transmission ratio for the second axle with the torque-deceleration, as well as with the already estimated coefficient of friction of the first axle.

Due to the unknown coefficient of friction of the brake system, the target braking torque usually differs from the actual braking torque. Several actuator system (for example EM) are known, which can apply a braking torque with a higher precision than the braking system. The target braking torque therefore corresponds well to the actual braking torque. A torque is adjusted by means of an accurate actuator (target braking torque=actual braking torque) and the vehicle deceleration or the wheel deceleration is measured and the transmission ratio torque-deceleration is determined.

After that, a target braking torque is applied via the hydraulic brake system to the first axle and the vehicle or wheel deceleration is measured and the braking torque is closed with the inverse transmission ratio-deceleration for the actual braking torque of the coefficient of friction of this axle. Since the target braking torque and the nominal coefficient of friction are known, the actual coefficient of friction can be inferred as follows:

actual coefficient of friction=actual torque/target
torque*nominal coefficient of friction As an alternative, the actual coefficient of friction can be calculated or approximated by measuring the braking pressure:

actual coefficient of friction=actual torque/braking
pressure.

At this point, a target braking torque is applied to both axles with a determined ratio (for example with a stable distribution of the braking force) and the deceleration is measured. After that, the actual braking torque and thus also the coefficient of friction of the brake is estimated for the second axle with the inverse transmission ratio, as well as with the already estimated coefficient of friction of the first axle and with the adjusted distribution of the actual braking torque, and the coefficient of friction of the brake is thus also determined for the second axle.

The determination of the coefficient of friction of a hydraulic brake system with axle-individual pressure buildup for the second axle of a motor vehicle provided with two axles thus comprises the following steps: applying a target braking torque with a predetermined distribution ratio to both axles of the motor vehicle via the hydraulic brake system, measuring the deceleration of the second axle or of the motor vehicle which is caused by the braking torque, and estimating the actual braking torque of the second axle via the inverse of the transmission ratio between the braking torque and the deceleration of a wheel of the first axle, or of the first axle, or of the motor vehicle, as well as with the calculated coefficient of friction of the first axle and of the predetermined distribution ratio of the applied target braking torque, and finally calculating the coefficient of friction of the hydraulic braking system with individual pressure buildup for the second axle of the motor vehicle.

In many cases, one is not interested in the coefficient of friction, but in the relationship between the target and the actual braking torque of the brake system. The target braking torque of the brake system can be multiplied by this factor per axle in order to obtain the desired torque per axle. For this purpose, the actual braking torque of the brake system is determined for each axle in the same manner as described above and it is applied to the target braking torque of the brake system.

Another object achieved within the context of the present invention is setting a desired actual torque with a hydraulic brake system to a wheel or to an axle. In this case, the item of interest is not the coefficient of friction, but the ratio between the target braking torque and the actual braking torque of the hydraulic brake system per axle. As a quotient obtained from the target braking torque and the actual braking torque, the ratio corresponds to a factor with which the target braking torque of the brake system can be multiplied per axle in order to obtain the braking torque per axle. For this purpose, the actual braking torque of the braking system is determined per axle as shown above and it is applied to the target braking torque of the brake system.

The object of the invention is therefore also a system and a method for adapting the target braking torque of a hydraulic brake system to axle-individual pressure buildup of a motor vehicle in order to achieve a desired actual braking torque at an axle of the motor vehicle. The desired actual braking torque in this case correspond to the original braking torque.

The method comprises the setting of a braking torque (target=actual) at a wheel or at an axle of the motor vehicle by means of an actuator system which has a higher actuating precision than the hydraulic brake system, and the measurement of the deceleration of the wheel or of the axle or of the vehicle caused by the braking torque, with a subsequent determination of the transmission ratio between the braking torque and the deceleration of the wheel or of the axle or of the motor vehicle. Furthermore, the method comprises applying a target brake torque to the wheel or to the axle of the motor vehicle via the hydraulic brake system, measuring the deceleration of the wheel or of the axle or of the motor vehicle caused by the braking torque, and estimating the actual braking torque by means of the inverse of the transmission ratio between the braking torque and the deceleration of the wheel or axle. After that, the relationship between the target braking torque and the actual braking torque of the hydraulic brake system per axle is calculated and the target braking torque of the hydraulic brake system is multiplied per axle by the factor obtained in this manner in order to obtain a target braking torque, which generates an actual braking torque that corresponds to the original target braking torque.

Furthermore, the invention provides a system for adjusting the target braking torque of a hydraulic brake system to axle-individual pressure buildup of a motor vehicle to obtain a desired braking torque at an axles. The desired actual braking torque in this case corresponds to the original braking torque. The system comprises at least one hydraulic brake system with axle-individual pressure buildup which acts on a wheel or on an axle of the motor vehicle, and at least one other actuator system, which can apply a braking torque to the wheel or to the axle at a higher actuating precision than the hydraulic brake system.

The system comprises also at least one sensor, a unit for calculating an actual braking torque from the sensor data, and a unit for changing the target braking torque of the hydraulic brake system.

Example of other suitable actuator systems include axle motors and EM motors for individual wheels. Suitable sensors are for example sensors for the rotational speed of the wheel, wheel speed sensors, sensors for measuring vehicle deceleration, or brake pressure sensors.

It goes without saying that the features mentioned above can be used not only in the respectively described combinations, but also in other combinations or in isolation, without deviating from the scope of the present invention.

The invention claimed is:

1. A system for estimating a coefficient of friction of a hydraulic brake system, the hydraulic brake system being configured to apply an individualized brake pressure to each axle of a motor vehicle, comprising:
   at least one hydraulic brake system configured to apply the individualized brake pressure to each axle of the motor vehicle, which acts on a wheel or an axle of the motor vehicle;
   at least one other actuator system, which can apply a braking torque to the wheel or to the axle of the motor vehicle, the at least one other actuator system having a higher actuating precision than that of the at least one hydraulic brake system;
   at least one sensor; and
   a unit for calculating an estimated coefficient of friction from data received from the at least one sensor according to a relationship between:
   a transmission ratio between the braking torque and a deceleration of the wheel, of the axle, or of the motor vehicle when the motor vehicle is braked by an actual torque applied by the at least one other actuator system; and
   the deceleration of the wheel, of the axle, or of the motor vehicle when the motor vehicle is braked by a target torque applied by the at least one hydraulic brake system.

2. The system according to claim 1, wherein the at least one other actuator system is a plurality of other actuator systems distributed so that each axle of the motor vehicle is provided with at least one of the plurality of other actuator systems.

3. The system according to claim 1, wherein the at least one other actuator system comprises at least one axle motor and/or at least one EM-individual wheel motor.

4. The system according to claim 1, further comprising at least one wheel rotational speed sensor and/or at least one sensor for measuring a vehicle deceleration.

5. The system according to claim 1, further comprising at least one brake pressure sensor.

6. A system for changing an original braking torque of a hydraulic braking system to a desired actual braking torque, the hydraulic brake system being configured to apply an individualized brake pressure to each axle of a motor vehicle, comprising:
   at least one hydraulic brake system configured to apply the individualized brake pressure to each axle of the motor vehicle, which acts on a wheel or an axle of the motor vehicle;
   at least one other actuator system, which can apply a braking torque to a wheel or to an axle of the motor vehicle, the at least one other actuator system having a higher actuating precision than that of the at least one hydraulic brake system;

at least one sensor; and a unit for changing the original braking torque of the hydraulic brake system based on data received from the at least one sensor according to a relationship between:

a transmission ratio between the braking torque and a deceleration of the wheel, of the axle, or of the motor vehicle when the motor vehicle is braked by an actual torque applied by the at least one other actuator system; and the deceleration of the wheel, of the axle, or of the motor vehicle when the motor vehicle is braked by a target torque applied by the at least one hydraulic brake system.

7. The system according to claim 6, wherein the at least one other actuator system comprises at least one axle motor and/or at least one EM motor for individual wheels.

8. The system according to claim 6, further comprising at least one wheel rotational speed sensor and/or at least one sensor for measuring a vehicle deceleration.

9. The system according to claim 6, further comprising at least one brake pressure sensor.

\* \* \* \* \*